(12) United States Patent
Nakayama et al.

(10) Patent No.: US 6,339,128 B1
(45) Date of Patent: Jan. 15, 2002

(54) POLYOLEFIN RESIN MODIFIER, POLYOLEFIN RESIN COMPOSITION AND ORIENTED POLYOLEFIN FILM

(75) Inventors: Nobuhiko Nakayama; Isao Masada; Akira Aoki; Manabu Kaminaka, all of Tokuyama (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/536,980

(22) Filed: Mar. 29, 2000

(30) Foreign Application Priority Data

Mar. 30, 1999 (JP) .............................. 11-088365

(51) Int. Cl.$^7$ ................................ C08L 23/12
(52) U.S. Cl. ...................... 525/191; 525/240
(58) Field of Search ................... 525/191, 240

(56) References Cited

U.S. PATENT DOCUMENTS

| 4,798,081 A | * | 1/1989 | Hazlitt et al. .................. 73/53 |
| 5,681,897 A | * | 10/1997 | Silvis et al. ................. 525/150 |

FOREIGN PATENT DOCUMENTS

| EP | 0538749 A1 | 4/1993 |
| EP | 0982328 A1 | 3/2000 |
| EP | 0994152 A1 | 4/2000 |
| JP | A583006 | 5/1983 |
| JP | A7292029 | 11/1995 |
| JP | A9324014 | 12/1997 |

OTHER PUBLICATIONS

XP002140064 & JP 07 278377 A; Database WPI, Section Ch, Week 199551, Derwent Publications Ltd., Oct. 24, 1995; Abstract.

A.C. van Asten et al., Journal of Chromatography; Determination of the compositional . . . ; vol. 703, No. 1, May 26, 1995; pp. 245–263.

* cited by examiner

*Primary Examiner*—Nathan M. Nutter
(74) *Attorney, Agent, or Firm*—Birch, Stewart, Kolasch & Birch, LLP

(57) ABSTRACT

A crystalline polyolefin resin composition contains:

(A1) 4 to 20 wt % of a polyolefin resin component having an elution temperature of 36 to 104° C. and a molecular weight of 100,000 to 1,000,000 measured by TREF/SEC; and (B) 96 to 80 wt % of a crystalline polyolefin resin component different from the above component (A1), the wt % being based on the total weight of the components (A1) and (B).

11 Claims, No Drawings

POLYOLEFIN RESIN MODIFIER, POLYOLEFIN RESIN COMPOSITION AND ORIENTED POLYOLEFIN FILM

DETAILED DESCRIPTION OF THE INVENTION

The present invention relates to a polyolefin resin modifier and, particularly, to a modifier effective in improving the film processability, stretchability and heat resistance such as low thermal shrinkage of a crystalline polyolefin resin used in an oriented film, for example, a polypropylene-based resin, a modified polyolefin resin composition and an oriented film formed from the resin composition.

An oriented polyolefin film, particularly a biaxially oriented polyolefin film is widely used as a packaging material and the like thanks to its excellent mechanical and optical properties. To produce the film, sequential biaxial orientation using a tenter system is generally employed.

In recent years, the production equipment of biaxially oriented polyolefin films has been becoming larger in size and higher in speed. When a biaxially oriented film is to be produced from a conventional general polyolefin resin with the equipment, such problems as a rise in mechanical load to a stretching machine, a reduction in the thickness accuracy of a film and the breakage of a film by stretching have arisen. Therefore, various methods for improving stretchability have been proposed. For example, JP-A 9-324014 (the term "JP- A" as used herein means an "unexamined published Japanese patent application") proposes a technology in which an amorphous component is contained in a specific amount and an isotacticity distribution is made wide. However, there still remains room for the improvement of the obtained film to produce an oriented polyolefin film having excellent film formability at the time of high-speed film formation and excellent mechanical properties and heat resistance.

Therefore, the development of a polyolefin resin having excellent stretchability which can be produced with large-sized and high-speed oriented polyolefin film production equipment has been desired.

It is therefore an object of the present invention to provide a polyolefin resin composition which has a wide temperature control range for film formation at the time of stretching and a small mechanical load, is excellent in the thickness accuracy of the formed film and stretchability, can be produced stably without being broken by stretching or the like, and is suitable for the production of a uniaxially or biaxially oriented film having excellent heat resistance such as the thermal shrinkage of the formed film.

It is another object of the present invention to provide a polyolefin resin which can provide the above excellent characteristic properties to a polyolefin resin composition obtained by mixing a crystalline polyolefin resin and a modifier comprising the same.

It is still another object of the present invention to provide an oriented film formed from the above polyolefin resin composition of the present invention.

The other objects and advantages of the present invention will become apparent from the following description.

According to the present invention, firstly, the above objects and advantages of the present invention are attained by a crystalline polyolefin resin composition comprising:

(A1) 4 to 20 wt % of a polyolefin resin component having an elution temperature of 36 to 104° C. and a molecular weight of 100,000 to 1,000,000 measured by a direct coupling method (TREF/SEC) of size exclusion chromatography (SEC) to temperature rising elution fractionation (TREF); and (B) 96 to 80 wt % of a crystalline polyolefin resin component different from the above component (A1), the wt % being based on the total of the components (A1) and the above (B).

According to the present invention, secondly, the above objects and advantages of the present invention are attained by an oriented film formed from the above crystalline polyolefin resin composition of the present invention.

According to the present invention, thirdly, the above objects and advantages of the present invention are attained by a modifier for a crystalline polyolefin resin comprising more than 20 wt % to 100 wt % of a component having an elution temperature of 36 to 104° C. and a molecular weight of 100,000 to 1,000,000 measured by the direct coupling method (TREF/SEC) of size exclusion chromatography (SEC) to temperature rising elution fractionation (TREF) and by a modifier comprising the same.

According to the present invention, fourthly, the above objects and advantages of the present invention are attained by a modifier for a crystalline polyolefin resin comprising 20 to 100 wt % of a component having an elution temperature of more than 116° C. and a molecular weight of 10,000 to 100,000 measured by the direct coupling method (TREF/SEC) of size exclusion chromatography (SEC) to temperature rising elution fractionation (TREF) and by a modifier comprising the same.

The present invention will be descried in detail hereinunder.

In the present invention, the direct coupling method (TREF/SBC) of size exclusion chromatography (SEC) to temperature rising elution fraction (TREF) is an analytical method which directly couples temperature rising elution fractionation (TREF) to size exclusion chromatography (SEC) on an on-line basis and will be simply referred to as "TREF/SEC" hereinafter. TREF/SEC is a method of evaluating the composition distribution of a polyolefin by dissolving the polyolefin (such as a polypropylene resin) crystallized in a solution in a solvent at different temperatures and continuously measuring the molecular weight distribution and the elution (concentration) of the polyolefin at each dissolution temperature. That is, an inert carrier such as diatomaceous earth or silica beads are used as a filler, a sample solution dissolved an amount of a polyolefin in a solvent such as orthodichlorobenzene as a sample is injected into the TREF column of the filler, the temperature of the TREF column is lowered to adhere the sample to the surface of the filler, the temperature of the column is elevated stepwise to a desired level, the orthodichlorobenzene solvent is passed through the column, the polyolefin component eluted at the above temperature is continuously introduced into a high-temperature SEC column, and the elution (wt %) and molecular weight distribution of the polyolefin are measured. The composition distribution of the polyolefin can be seen from a graph (the relationship between crystallizability and molecular weight is expressed by a contour or a bird's-eye view) drawn based on the elution temperature (° C.) and the molecular weight distribution of the polyolefin by this operation. A projection diagram of elution temperature shows a crystallizability distribution and the crystallinity distribution of the polymer can be obtained from the relationship between elution temperature and the elution (wt %) of a polymer because the elution temperature becomes higher as the elution component is crystallized more easily.

In the above method, the cooling rate of the TREF column must be adjusted to a speed required for the crystallization of a crystalline portion contained in the polyolefin sample at a predetermined temperature and can be determined experimentally in advance. The cooling rate of the column is generally set to a range of 5° C./min or less.

Crystalline Polyolefin Resin Composition

In the present invention, it is important that the component (A1) having an elution temperature of 36 to 104° C. and a molecular weight of 100,000 to 1,000,000 measured by TREF/SEC should be contained in the crystalline polyolefin resin composition in an amount of 4 to 20 wt %, preferably 5 to 18 wt %, more preferably 6 to 15 wt %. When the amount of the above effective component (A1) contained in the crystalline polyolefin resin composition is smaller than 4 wt %, stretchability at the time of film formation lowers, the range of film processable temperature narrows and a mechanical load rises, thereby increasing the breakage of a film by stretching and deteriorating the thickness accuracy of a film. When the amount of the above effective component (A1) is larger than 20 wt %, the thermal shrinkage of an oriented film increases with the result of a reduction in heat resistance.

Preferably, the above effective component (A1) has an elution temperature of 40 to 88° C. and a molecular weight of the elution component at a temperature range of 44 to 68° C. of 100,000 to 1,000,000 measured by TREF/SEC.

The crystalline polyolefin resin composition of the present invention is produced by the following methods: one in which a polyolefin containing the effective component (A1) in an amount of 20 to 100 wt % (to be referred to as "the modifier (A1)" herein after) is produced and mixed with a crystalline polyolefin resin mechanically and one in which a catalyst used for the polymerization of a crystalline polyolefin resin is suitably selected and the crystalline polyolefin resin and the effective component are produced in a polymerization system and obtained as a mixture. That is, to obtain the polyolefin resin composition of the present invention with ease, the former method is preferred but the latter method is effective in many cases to obtain a uniform mixture of the modifier of the present invention and a crystalline polyolefin resin.

In the description of the present invention, a substantially uniformly united product of the effective component (A1) and the crystalline polyolefin resin is referred to as "polyolefin resin composition of the present invention" irrespective of the method of mixing the modifier (A1) and the crystalline polyolefin resin component.

The polyolefin resin composition of the present invention has a melt flow rate (MFR) of preferably 0.1 to 20 g/10 min, more preferably 1 to 10 g/10 min in consideration of its moldability into a film. The weight average molecular weight (Mw) of the polyolefin resin composition is preferably 200,000 to 800,000, more preferably 250,000 to 450,000. The molecular weight distribution expressed by the Mw/Mn ratio of weight average molecular weight (Mw) to number average molecular weight (Mn) is preferably in the range of 2 to 20, more preferably 4 to 10 in consideration of film processing ease and the improvement of workability caused by an increase in melt tension. The above molecular weight distribution is obtained from weight average and number average molecular weights calculated from the universal calibration curve of polypropylene measured by SEC at 145° C. using orthodichlorobenzene as a solvent from an elution profile measured under the same measurement conditions. The melting point of the polyolefin resin is preferably 130° C. or more, more preferably 135 to 170° C., particularly preferably 140 to 160° C. The expression "melting point" as used herein denotes the peak temperature of a crystal melting curve at the time of temperature elevation measured with a differential scanning calorimeter (to be simply abbreviated as DSC hereinafter).

The peak temperature of an elution curve measured by the TREF of the above polyolefin resin composition is preferably in the range of 100 to 130° C., more preferably 110 to 125° C., particularly preferably 115 to 120° C. in consideration of the rigidity and heat resistance of an oriented film obtained from the polyolefin resin composition. TREF is a method of evaluating the crystallizabillity distribution of a polyolefin by dissolving the polyolefin (such as a polypropylene resin) crystallized in a solution in a solvent at different temperatures and continuously measuring the elution (concentration) of the polyolefin at each dissolution temperature. That is, a sample solution having a certain concentration prepared by dissolving a sample polyolefin in an orthodichlorobenzene solvent is injected into the TREF column of an inert carrier such as diatomaceous earth or silica beads as a filler, the temperature of the TREF column is lowered to adhere the sample to the surface of the filler, the column temperature is elevated to a desired temperature linearly, the orthodichlorobenzene solvent is passed through the column, and the elution (wt %) of the polyolefin component eluted at the above temperature is measured. The crystallizabillity distribution of the polyolefin at the elution temperature can be seen by this operation. In this method, the descending speed of the temperature of the TREF column must be adjusted to a speed required for the crystallization of a crystalline portion contained in the sample polyolefin at a predetermined temperature. The cooling rate of the TREF column can be determined experimentally in advance. The cooling rate of the column is generally set to a range of 5° C./min or less.

The amount of the component having an elution temperature of 0° C. or less measured by TREF/SEC of the above polyolefin resin composition is preferably 10 wt % or less, more preferably 7 wt % or less, particularly preferably 5 wt % or less in consideration of the surface properties such as anti-blocking properties, scratch resistance and slipperiness of the formed polyolefin film.

Further, the molecular weight of the elution component measured at 0° C. by TREF/SEC of the above polyolefin resin composition is preferably 10,000 to 400,000, more preferably 150,000 to 300,000 in terms of molecular weight at the peak top of a molecular weight distribution curve of the elution component at 0° C. measured by SEC in consideration of bleed-out to the surface of a film and the formation of a fish-eye.

When the polyolefin resin composition of the present invention contains a component having an elution temperature of 36 to 104° C. and a molecular weight of 100,000 to 1,000,000 measured by TREF/SEC in an amount of 4 to 20 wt %, it achieves excellent thickness accuracy and stretchability. The polyolefin resin composition of the present invention contains a polyolefin component having an elution temperature of more than 116° C. and a molecular weight of 10,000 to 100,000 measured by TREF/SEC in an amount of preferably 4 to 20 wt %, more preferably 5 to 15 wt %, particularly preferably 6 to 10 wt % to further improve heat resistance such as the thermal shrinkage of the formed oriented film. The polyolefin component is the same olefin polymer or copolymer as the modifier.

Crystalline Polyolefin Resin

The crystalline polyolefin resin used in the present invention is preferably a propylene homopolymer, a propylene-α-olefin copolymer containing an α-olefin other than propylene as a comonomer or a mixture thereof.

The above propylene-α-olefin copolymer is preferably a propylene-α-olefin copolymer containing one or more α-olefin monomer units other than propylene in an amount of 10 mol % or less, more preferably 5 mol % or less, or a mixture thereof. Examples of the α-olefin include α-olefins having 2 or 4 to 20 carbon atoms such as ethylene, butene-1, pentene-1, 3-methyl-1-butene, hexene-1, 3-methyl-1-pentene, 4-methyl-1-pentene, heptene-1, octene-1, nonene-1, decene-1, dodecene-1, tetradecene-1, hexadecene-1, octadecene-1 and eicosene-1. The above propylene-α-olefin copolymer may be either an random copolymer or block copolymer. Out of these, a random copolymer is preferred.

When the above crystalline polyolefin resin is a propylene homopolymer or a propylene-α-olefin copolymer which contains an α-olefin other than propylene in an amount of less than 1 mol %, the fraction of isotactic pentad sequence measured by $^{13}$C-NMR indicating crystallizability is preferably 0.80 to 0.99, more preferably 0.85 to 0.98, particularly preferably 0.87 to 0.97. The fraction of isotactic pentad sequence is a fraction at which 5 propylene units determined based on the assignment of the peak of the $^{13}$C-NMR spectrum take equal configuration continuously, as reported by A. Zambelli et al in Macromolecules 13, 267, 1980.

The crystalline polyolefin resin used in the present invention is not limited to the above polypropylene-based resin and may be a polyolefin resin which is an olefin polymer or copolymer other than a polypropylene-based resin and contains a crystal portion measured by X-ray diffraction in an amount of 30% or more, preferably 40% or more.

Modifier (A1)

The modifier (A1) used in the present invention contains a component (A1) having an elution temperature of 36 to 104° C. and a molecular weight of 100,000 to 1,000,000 measured by TREF/SEC in an amount of 20 to 100 wt % as described above. The amount of the above component is preferably 40 to 100 wt %, more preferably 50 to 100 wt %. It is more preferred that a component having an elution temperature of 40 to 88° C. and a molecular weight of 100,000 to 1,000,000 measured by TREF/SEC should be contained in an amount of 50 to 100 wt %. It is the most preferred that a component having an elution temperature of 44 to 68° C. and a molecular weight of 100,000 to 1,000,000 should be contained in an amount of 50 to 100 wt %.

A crystalline polyolefin resin having lower crystallinity than the above crystalline polyolefin resin may be used as the modifier (A1) without restriction. The modifier (A1) is, for example, an α-olefin homopolymer, a copolymer of two or more α-olefins, or a mixture thereof. The α-olefin copolymer may be either a random copolymer or block copolymer. Out of these, a random copolymer is preferred. Examples of the α-olefin include ethylene, propylene, butene-1, pentene-1, 3-methyl-1-butene, hexene-1, 3-methyl-1-pentene, 4-methyl-1-pentene, heptene-1, octene-1, nonene-1 and the like. Out of these modifiers (A1), a propylene homopolymer, ethylene-propylene copolymer, ethylene-1-hexene copolymer, ethylene-1-octene copolymer, propylene-1-butene copolymer, propylene-1-hexene copolymer, propylene-ethylene-1-butene copolymer and mixtures thereof are particularly preferred.

The melt flow rate of the modifier (A1) is preferably 1 to 20 g/10 min. The weight average molecular weight (Mw) of the modifier (A1) is preferably in the range of 100,000 to 400,000. Further, the molecular weight distribution (Mw/Mn) of the modifier (A1) is preferably in the range of 1.5 to 15.

Preferably, the modifier (A1) has at least one melting peak at a range of 60 to 150° C.

The component having an elution temperature of 0° C. or less measured by TREF/SEC of the above modifier (A1) is preferably contained in an amount of 5 wt % or less, more preferably 4 wt % or less, particularly preferably 3 wt % or less in consideration of the surface properties such as anti-blocking properties, scratch resistance and slipperiness of the formed polyolefin film.

The modifier (A1) can be prepared by polymerizing eluting components forming the modifier (A1) separately and mixing these. Alternatively, it can be prepared as a block copolymer which can attain a state in which a polypropylene component and a propylene-ethylene random copolymer component are arranged in a single molecular chain and/or a microscopically mixed state unattainable by mechanical mixing of the molecular chains of the polypropylene component and the propylene-ethylene random copolymer component. The block copolymer is preferred because it has an excellent stretchability improving effect and a more transparent oriented film is obtained.

A preferred production method for obtaining the modifier (A1) as a block copolymer comprises forming a polypropylene component (a) and a propylene-ethylene copolymer component (b) stepwise in the presence of a catalyst which comprises a metallocene compound (to be referred to as "component (I)" hereinafter) and an aluminoxane compound or non-coordination ionized compound (to be referred to as "component (II)" hereinafter).

The above component (I) is a known compound which is used for the polymerization of an olefin. A chiral compound represented by the following formula (1) is advantageously used as the component (I):

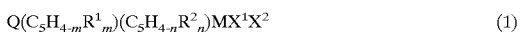

$$Q(C_5H_{4-m}R^1_m)(C_5H_{4-n}R^2_n)MX^1X^2 \tag{1}$$

wherein M is the transition metal atom of the group IV of the periodic table, $(C_5H_{4-m}R^1_m)$ and $(C_5H_{4-n}R^2_n)$ are each a substituted cyclopentadienyl group, m and n are each an integer of 1 to 3, $R^1$ and $R^2$ may be the same or different and each a hydrocarbon group having 1 to 20 carbon atoms, silicon-containing hydrocarbon group or hydrocarbon group forming at least one hydrocarbon ring which may be bonded to two carbon atoms on a cyclopentadienyl ring to be substituted by a hydrocarbon, Q is a divalent hydrocarbon group, non-substituted silylene group or hydrocarbon-substituted silylene group which can crosslink $(C_5H_{4-m}R^1_m)$ and $(C_5H_{4-n}R^2_n)$, and $X^1$ and $X^2$ may be the same or different and each hydrogen, halogen or hydrocarbon group.

The component (I) is preferably a chiral metallocene compound of the above formula (1) in which M is a zirconium or hafnium atom, $R^1$ and $R^2$ are the same or different hydrocarbon groups having 1 to 20 carbon atoms, $X^1$ and $X^2$ are the same or different halogen atoms, and the hydrocarbon group Q is a hydrocarbon-substituted silylene group.

Illustrative examples of the component (I) include rac-dimethylsilylene(2,4-dimethylcyclopentadienyl)(3',5'-dimethylcyclopentadienyl)zirconium dichloride, rac-dimethylsilylene(2,4-dimethylcyclopentadienyl)(3',5'-dimethylcyclopentadienyl)zirconium dimethyl, rac-dimethylsilylene(2,3,5-trimethylcyclopentadienyl)(2',4',5'-trimethylcyclopentadienyl)zirconium dichloride, rac-dimethylsilylene(2,3,5-trimethylcyclopentadienyl)(2',4',5',5'-trimethylcyclopentadienyl)zirconium dimethyl, rac-dimethylsilylenebis(2-methyl-indenyl)zirconium dichloride, rac-diphenylsilylenebis(2-methyl-indenyl)zirconium dichloride, rac-dimethylsilylenebis(2-methyl-indenyl)zirconium dimethyl, rac-diphenylsilylenebis(2-methyl-indenyl)zirconium dimethyl, rac-dimethylsilylenebis(2- methyl-4,5,6,7-tetrahydroindenyl)zirconium dichloride, rac-diphenylsilylenebis(2-methyl-4,5,6,7-tetrahydroindenyl)zirconium dichloride, rac-dimethylsilylenebis(2-methyl-4,5,6,7-tetrahydroindenyl)zirconium dimethyl, rac-diphenylsilylenebis( 2-methyl-4,5,6,7-tetrahydroindenyl)zirconium dimethyl, rac-dimethylsilylenebis(2,4-dimethyl-indenyl)zirconium dichloride, rac-diphenylsilylenebis(2,4-dimethyl-indenyl)zirconium dichloride, rac-dimethylsilylenebis(2,4-dimethyl-indenyl)zirconium dimethyl, rac-diphenylsilylenebis(2,4-dimethyl-indenyl)zirconium dimethyl, rac-dimethylsilylenebis(2-methyl-4-isopropylindenyl)zirconium dichloride, rac-diphenylsilylenebis(2-methyl-4-isopropylindenyl)zirconium dichloride, rac-dimethylsilylenebis(2-methyl-4-isopropylindenyl)zirconium dimethyl, rac-diphenylsilylenebis(2-methyl-4-isopropylindenyl)zirconium dimethyl, rac-dimethylsilylenebis(2-methyl-4,6-diisopropylindenyl)zirconium dichloride, rac-diphenylsilylenebis(2-methyl-4,6-diisopropylindenyl)zirconium dichloride, rac-dimethylsilylenebis(2-methyl-4,6-diisopropylindenyl)zirconium dimethyl, rac-diphenylsilylenebis(2-methyl-4,6-diisopropylindenyl)zirconium dimethyl, rac-dimethylsilylenebis(2-methyl-4-t-butylindenyl)zirconium dichloride, rac-diphenylsilylenebis(2-methyl-4-t-butylindenyl)zirconium dichloride, rac-dimethylsilylenebis(2-methyl-4-t-butylindenyl)zirconium dimethyl, rac-diphenylsilylenebis(2-methyl-4-t-butylindenyl)zirconium dimethyl, rac-dimethylsilylenebis(2-methyl-4-phenylindenyl)zirconium dichloride, rac-diphenylsilylenebis(2-methyl-4-phenylindenyl)zirconium dichloride, rac-dimethylsilylenebis(2-methyl-4-phenylindenyl)zirconium dimethyl, rac-diphenylsilylenebis(2-methyl-4-phenylindenyl)zirconium dimethyl, rac-dimethylsilylenebis(2-methyl-4-naphthylindenyl)zirconium dichloride, rac-diphenylsilylenebis(2-methyl-4-naphthylindenyl)zirconium dichloride, rac-dimethylsilylenebis(2-methyl-4-naphthylindenyl)zirconium dimethyl, rac-diphenylsilylenebis(2-methyl-4-naphthylindenyl)zirconium dimethyl, rac-dimethylsilylenebis(2-methyl-benzindenyl)zirconium dichloride, rac-diphenylsilylenebis(2-methyl-benzindenyl)zirconium dichloride, rac-dimethylsilylenebis(2-methyl-benzindenyl)zirconium dimethyl, rac-diphenylsilylenebis(2-methyl-benzindenyl)zirconium dimethyl and the like.

Compounds obtained by replacing the zirconium of the above compounds by hafnium may be advantageously used. The above metallocene compounds may be used in combination.

Out of the above components (II), aluminum compounds represented by the following formulas (2) or (3) are preferred as the aluminoxane compound.

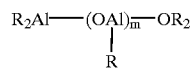

(2)

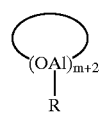

(3)

In the above formulas (2) and (3), R is an alkyl group having 1 to 6 carbon atoms, preferably 1 to 4 carbon atoms. Examples of the alkyl group include methyl group, ethyl group, propyl group, butyl group and isobutyl group, out of which methyl group is preferred. Part of R's may be an alkyl group having 2 to 6 carbon atoms. m is an integer of 4 to 100, preferably 6 to 80, particularly preferably 10 to 60.

To produce the above aluminoxane compound, various known methods may be employed. They include one in which a trialkylaluminum is directly reacted with water in a hydrocarbon solvent and one in which a trialkylaluminum is reacted with water adsorbed in a hydrocarbon solvent using copper sulfate hydrate having crystallization water, aluminum sulfate hydrate, hydrated silica gel or the like.

Out of the above components (II), known non-coordination ionized compounds other than the above aluminoxane compounds are used as the non-coordination ionized compound. Ionized compounds containing a boron atom are particularly preferred.

Out of the ionized compounds containing a boron atom, Lewis acid containing a boron atom and ionic compounds containing a boron atom are preferred. The Lewis acid containing a boron atom is a compound represented by the following formula (4).

$$BR_3 \quad (4)$$

In the above formula, R is a phenyl group having a substituent such as a fluorine atom, methyl group or trifluoromethyl group, or fluorine atom.

Illustrative examples of the compound represented by the above formula (4) include trifluoroborane, triphenylborane, tris(4-fluorophenyl)borane, tris(3,5-diflurophenyl)borane, tris(4-fluoromethylphenyl)borane, tris(pentafluorophenyl)borane, tris(p-tolyl)borane, tris(o-tolyl)borane, tris(3,5-dimethylphenyl)borane and the like. Out of these, tris(pentafluoro)borane is preferred.

The ionic compound containing boron is a trialkyl-substituted ammonium salt, N,N-dialkylanilinium salt, dialkylammonium salt, triaryl phosphonium salt or the like. Specific examples of the trialkyl-substituted ammonium salt include triethylammonium tetra(phenyl)boron, tripropylammoniumtetra(phenyl)boron, tri(n-butyl)ammonium tetra(phenyl)boron, trimethylammonium (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tri(n-butyl)ammonium tetra(o-tolyl)boron and the like. Examples of the N,N-dialkylanilinium salt include N,N-dimethylanilinium tetra(phenyl)boron, N,N-diethylanilinium tetra(phenyl)boron, N,N-2,4,6-pentamethylanilinium tetra(phenyl)boron and the like. Examples of the dialkylammonium salt include di(1-propyl)ammonium tetra(pentafluorophenyl)boron, dicyclohexylammonium tetra(phenyl)boron and the like. Examples of the triarylphosphonium salt include triphenylphosphonium tetra(phenyl)boron, tri(methylphenyl)phosphonium tetra(phenyl)boron, tri(dimethylphenyl)phosphonium tetra(phenyl)boron and the like.

Out of the Lewis acids containing a boron atom and the ionic compounds containing a boron atom listed above, triphenylcarbonium tetrakis(pentafluorophenyl)borate, N,N-dimethylanilinium tetrakis(pentafluorophenyl)borate and ferrocenium tetra(pentafluorophenyl)borate are preferred. Triphenylcarbonium tetrakis(pentafluorophenyl)borate and N,N-dimethylanilinium tetrakis(pentafluorophenyl)borate are more preferred.

The components (I) and (II) may be used in any amounts. When an aluminoxane compound is used as the component (II), the amount of the component (II) (the molar amount of an Al atom in the component (II)) is preferably 0.1 to 100,000 mols, more preferably 1 to 50,000 mols, particularly preferably 10 to 30,000 mols based on 1 mol of a transition metal atom contained in the component (I). When a non-coordination ionized compound is used as the component (II), the amount of the component (II) (the molar amount of the 3B group atom in the component (II)) is preferably 0.01 to 10,000 mols, more preferably 0.1 to 5,000 mols, particularly preferably 1 to 3,000 mols based on 1 mol of a transition metal contained in the component (I).

An organic aluminum compound (to be referred to as "component (III)" hereinafter) may be used as required in the method of producing the polypropylene component (a) and the propylene-ethylene copolymer component (b) stepwise in the presence of a catalyst which comprises the component (I) and the component (II). The component (III) is preferably a compound represented by the following formula (5):

$$AlR_mX_{3-m} \qquad (5)$$

wherein R is an alkyl group having 1 to 10 carbon atoms, hydrocarbon group such as an aryl group or alkoxy group, X is a halogen atom, and m is an integer of 1 to 3 indicating the valence of Al.

Illustrative examples of the compound represented by the above formula (5) include trialkylaluminums such as trimethylaluminum, triethylaluminum, tri-n-propylaluminum, triisopropylaluminum, tri-n-butylaluminum, triisobutylaluminum, tri-n-hexylaluminum, tri-n-octylaluminum and tri-n-decylaluminum; dialkylaluminum monohalides such as diethylaluminum monochloride, diethylaluminum monobromide and diethylaluminum monofluoride; alkylaluminum halides such as methylaluminum sesquichloride, ethylaluminum sesquichloride and ethylaluminum dichloride; and alkoxyaluminums such as diethylaluminum monoethoxide and ethylaluminum diethoxide. Out of these, trialkylaluminums such as trimethylaluminum, triethylaluminum and triisobutylaluminum are preferred.

The amount of the component (III) is preferably 1 to 50,000 mols, more preferably 5 to 10,000 mols, particularly preferably 10 to 5,000 mols based on 1 mol of a transition metal atom contained in the component (I).

The component (I) and/or the component (II) may be carried on a particulate carrier (to be referred to as "component (IV)" hereinafter). When the above catalyst component(s) is(are) carried on the carrier, the particle properties of the obtained polymer are improved, thereby making it possible to prevent the adhesion of polymer scales to a reactor and greatly improve process applicability to the production of a resin.

The particulate carrier is what has a function as a carrier, particularly preferably an inorganic oxide.

Illustrative examples of the inorganic oxide include $SiO_2$, $Al_2O_3$, MgO, $ZrO_2$, $TiO_2$, $B_2O_3$, CaO, ZnO, BaO, $ThO_2$, and mixtures thereof such as $SiO_2$—$Al_2O_3$, $SiO_2$—MgO, $SiO_2$—$TiO_2$, $SiO_2$—$V_2O_5$, $SiO_2$—$Cr_2O_3$ and $SiO_2$—$TiO_2$—MgO. Out of these, carriers containing at least one component selected from the group consisting of $SiO_2$ and $Al_2O_3$ as the main ingredient are preferred.

The carrier preferably used in the present invention, whose properties differ according to its type and production method, has a particle diameter of 10 to 300 μm, preferably 20 to 200 μm, a specific surface area of 50 to 1,000 m³/g, preferably 100 to 700 m³/g and a pore volume of 0.3 to 3.0 cm³/g, preferably 0.5 to 2.5 cm³/g.

The inorganic particulate carrier is baked at preferably 150 to 1,000° C., more preferably 200 to 800° C.

The particle diameter of the carrier is preferably 0.1 to 500 μm, more preferably 1 to 200 μm, particularly preferably 10 to 100 μm. When the particle diameter is too small, a fine powder polymer is formed and when the particle diameter is too large, coarse particles are formed, thereby making it difficult to handle powders.

The pore volume of the carrier is preferably 0.1 to 5 cm³/g, more preferably 0.3 to 3 cm³/g. The pore volume can be measured by a BET method or mercury intrusion porosity method.

The amount of the metallocene compound (I) based on 1 g of the above particulate carrier (IV) is 0.005 to 1 mmol, preferably 0.05 to 0.5mmol in terms of transition metal atoms. When an aluminoxane compound is used as the component (II), the amount of the aluminoxane compound is preferably 1 to 200 mols, more preferably 15 to 150 mols in terms of the molar amount of an Al atom based on 1 mol of a transition metal atom contained in the component (I).

When a non-coordination ionized compound is used as the component (II), the amount of the non-coordination ionized compound is preferably 0.1 to 20 mols, more preferably 1 to 15 mols in terms of the molar amount of the group XIII atom contained in the non-coordination ionized compound based on 1 mol of a transition metal atom in the component (I).

To obtain a polymer having more excellent particle properties, the following methods may be employed. That is, an olefin is prepolymerized in the presence of the above components (I), (II) and (IV) and the component (III) as required. The amount of the component (III) to be prepolymerized is preferably 1 to 50,000 mols, more preferably 5 to 10,000 mols, particularly preferably 10 to 5,000 mols based on 1 mol of a transition metal atom contained in the component (I). The above components used for prepolymerization may be added sequentially or simultaneously in the form of a mixture. Preferably, the components (I) and (II) are contacted to the catalyst component (IV) in advance. More preferably, the component (II) is carried on the catalyst component (IV) and then the component (I) is carried on the catalyst component (IV). This method is effective in obtaining a random copolymer having a more excellent bulk specific gravity.

Examples of the olefin prepared for the preparation of a prepolymerization catalyst component include α-olefins such as ethylene, propylene, 1-butene, 1-pentene, 3-methyl-1-butene, 1-hexene, 4-methyl-1-pentene, 4,4-dimethyl-1-pentene, 1-heptene, 4-methyl-1-hexene, 4,4-dimethyl-1-hexene, 3-ethyl-1-hexene, 4-ethyl-1-hexene, 1-octene, 1-decene, 1-dodecene, 1-tetradecene, 1-hexadecene, 1-octadecene and 1-eicosene; and cyclic olefins such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene. In addition to these, styrene, dimethylstyrenes, allylnorbornene, allylbenzene, allylnaphthalene, allyltoluenes, vinylcyclopentane, vinylcyclohexane, vinylcycloheptane and dienes may also be used. Out of these, ethylene, propylene, 1-butene, 1-pentene, 3-methyl-1-butene, 1-hexene, 4-methyl-1-pentene, 4,4-dimethyl-1-pentene, 1-heptene, 4-methyl-1-hexene, 4,4-dimethyl-1-hexene, 3-ethyl-1-hexene, 4-ethyl-1-hexene, 1-octene, 1-decene, cyclopentene and vinylcyclohexane are preferred, and ethylene, propylene, 1-butene, 1-heptene, 3-methyl-1-butene, 1-hexene and 4-methyl-1-pentene are particularly preferred.

Prepolymerization is preferably the homopolymerization of 95 mol % or more of an olefin.

The amount of an olefin to be prepolymerized firstly in the present invention is preferably 0.1 to 1,000 g, more preferably 1 to 50 g based on 1 g of a catalyst formed from the catalyst components (I), (II) and (IV).

Particularly preferably, prepolymerization is carried out stepwise in such a manner that propylene is prepolymerized in the presence of the components (I), (II) and (IV) and the component (III) as required to obtain a first prepolymerization catalyst and then 1-butene is prepolymerized in the presence of the first prepolymerization catalyst and the above component (III).

The amount of the component (III) used for the prepolymerization is preferably 1 to 50,000 mols, more preferably 5 to 10,000 mols, particularly preferably 10 to 5,000 mols based on 1 mol of a transition metal atom contained in the component (I). After the first prepolymerization catalyst is obtained by the prepolymerization of propylene, unreacted propylene and the component (III) used as required are desirably removed by washing and then used for the subsequent prepolymerization.

Substantial homopolymerizations of 95 mol % or more, preferably 98 mol % or more each of propylene and 1-butene are carried out in the above prepolymerization stages.

The amount of propylene first prepolymerized is preferably 0.1 to 1,000 g, more preferably 1 to 10 g based on 1 g of a catalyst formed from the catalyst components (I), (II) and (IV). The amount of 1-butene prepolymerized subsequently is preferably 0.1 to 1,000 g, more preferably 1 to 500 g based on 1 g of a catalyst formed from the components (I), (II) and (III). The weight ratio of propylene to 1-butene is preferably 0.001 to 100, more preferably 0.005 to 10.

Slurry polymerization is preferably applied in prepolymerization. The solvent used for the slurry polymerization is a saturated aliphatic hydrocarbon such as hexane, heptane, cyclohexane, benzene or toluene, aromatic hydrocarbon or mixture thereof. The prepolymerization temperature is preferably -20 to 100° C., more preferably 0 to 60° C. The prepolymerization stages may be carried out at different temperatures. The prepolymerization time is suitably determined according to the prepolymerization temperature and the amount of prepolymerization. The prepolymerization pressure is, for example, atmospheric pressure to 5 kg/cm$^2$ in the case of slurry polymerization.

Prepolymerization of each stage may be carried out in either batch, semi-batch or continuous system.

After the end of prepolymerization, the obtained polymer is preferably washed with a saturated aliphatic hydrocarbon such as hexane, heptane, cyclohexane, benzene or toluene, aromatic hydrocarbon or mixed solvent thereof. The number of times of washing is preferably 5 to 6.

The modifier (A1) is produced by polymerizing a polypropylene component and a propylene-ethylene copolymer component stepwise in the presence of the above catalyst components. As for polymerization order, the polypropylene component (a) is preferably formed in the first stage and the propylene-ethylene copolymer component (b) in the second stage. Thereby, a polymer having excellent particle properties can be produced.

The polymerization of the polypropylene component (a) is carried out by supplying propylene alone or a mixture of propylene and other α-olefin including ethylene. The temperature for the polymerization of propylene is preferably 0 to 100° C., more preferably 20 to 80° C.

Hydrogen may be existent as a molecular weight modifier during the polymerization. Polymerization may be slurry polymerization using a monomer for use in polymerization as a solvent, vapor-phase polymerization or solution polymerization. Slurry polymerization using propylene itself as a solvent is preferred when process simplicity, reaction rate and the particle properties of the formed copolymer are taken into consideration.

Polymerization system may be either batch, semi-batch or continuous. Further, polymerization may be carried out in two or more stages under different conditions such as hydrogen concentration and polymerization temperature.

Thereafter, the random copolymerization of propylene and ethylene is carried out. The random copolymer component (b) of propylene and ethylene can be obtained by supplying ethylene gas continuously even after the polymerization of propylene in the case of slurry polymerization using propylene itself as a solvent or supplying mixed gas of propylene and ethylene in the case of vapor-phase polymerization.

The random copolymerization of propylene and ethylene is preferably carried out in a single stage after the polymerization of propylene but may be carried out in multiple stages by changing the concentration of ethylene. The temperature for the random copolymerization of propylene and ethylene is preferably 0 to 100° C., more preferably 20 to 80° C. Hydrogen may be used as a molecular weight modifier as required. Polymerization may be carried out by changing the concentration of hydrogen stepwise or continuously.

The random copolymerization system of propylene and ethylene may be either batch, semi-batch or continuous. Polymerization may be carried out in multiple stages. Polymerization may be slurry polymerization, vapor-phase polymerization or solution polymerization.

After the end of the polymerization, the monomers are evaporated from a polymerization system to obtain the propylene-based resin (modifier (A1)) of the present invention. This propylene-based resin may be subjected to conventional washing with a hydrocarbon having 7 or less carbon atoms or countercurrent washing.

Production of Crystalline Polyolefin Resin Composition

The method of producing the crystalline polyolefin resin composition of the present invention by mixing the above modifier (A1) with the crystalline polyolefin resin is not particularly limited. For instance, a powder blending method using a tumbler, Henschel mixer or the like, or pellet blending method may be used.

The crystalline polyolefin resin composition of the present invention may also be produced by forming the effective components of the modifier (A1) and the crystalline polyolefin in the same polymerization system and mixing the both components formed in the polymerization system. For example, several different polymerization catalyst components capable of forming polypropylene resins which differ from each other in isotacticity are mixed together to polymerize propylene. A method of polymerizing propylene by mixing a solid titanium catalyst component, organic aluminum compound and two or more electron donors which give polypropylene resins different from each other in isotacticity is particularly preferably employed. In this method, known electron donors which are generally used in the polymerization of propylene may be used without restriction. When an organic silicon compound represented by the following formula (V) or (VI) is used out of these, a composition containing a component having an elution temperature of 36 to 104° C. and a molecular weight of 100,000 to 1,000,000 measured by TREF/SEC in amount of 4 to 20 wt % is obtained with ease.

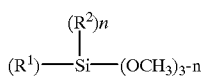

$$(R^1)-Si(OCH_3)_{3-n} \atop (R^2)_n \qquad (V)$$

wherein $R^1$, $R^2$ and $R^3$ are the same or different hydrocarbon groups, and n is 0 or 1.

Known compounds which are used for the polymerization of propylene may be used as the above solid titanium catalyst component. Solid titanium catalyst components containing titanium, magnesium or halogen and having high catalytic activity are particularly preferred. The catalyst components are titanium halides, particularly titanium tetrachloride carried on various magnesium compounds, particularly magnesium chloride.

Known compounds which are used for the polymerization of propylene may be used as the organic aluminum compound, as exemplified by trialkylaluminums such as trimethylaluminum, triethylaluminum, tri-n-propylaluminum, tri-n-butylaluminum, tri-isobutylaluminum, tri-n-hexylaluminum, tri-n-octylaluminum and tri-n-decylaluminum; diethylaluminum monohalides such as diethylaluminum monochloride; and alkylaluminum halides such as methylaluminum dichloride and ethylaluminum dichloride. Alkoxyaluminums such as monoethoxy diethylaluminum and diethoxy monoethylaluminum may also be used. Out of these, triethylaluminum is the most preferred. As for the amount of the organic aluminum compound, the molar ratio of aluminum atoms to titanium atoms contained in the solid titanium catalyst component is preferably 10 to 1,000, more preferably 50 to 500.

In the organic silicon compounds represented by the above formulas (V) and (VI), the hydrocarbon groups represented by $R^1$, $R^2$ and $R^3$ may be chain, branched or cyclic aliphatic hydrocarbon groups and aromatic hydrocarbon groups. The number of carbon atoms of the hydrocarbon groups is not particularly limited. The hydrocarbon groups preferably used in the present invention include alkyl groups having 1 to 6 carbon atoms such as methyl group, ethyl group, n-propyl group, i-propyl group, n-butyl group, i-butyl group, s-butyl group, t-butyl group, pentyl group and hexyl group; alkenyl groups having 2 to 6 carbon atoms such as vinyl group, propenyl group and allyl group; alkinyl groups having 2 to 6 carbon atoms such as ethynyl group and propynyl group; cycloalkyl groups having 5 to 7 carbon atoms such as cyclopentyl group, cyclohexyl group and cycloheptyl group; and aryl groups having 6 to 12 carbon atoms such as phenyl group, tolyl group, xylyl group and naphthyl group. Out of these, $R^3$ is preferably a linear alkyl group, alkenyl group or aryl group. n is 0 or 1.

Illustrative examples of the organic silicon compound represented by the formula (V) preferably used in the present invention include dimethyldimethoxysilane, diethyldimethoxysilane, dipropyldimethoxysilane, divinyldimethoxysilane, diallyldimethoxysilane, di-1-propenyldimethoxysilane, diethyldimethoxysilane, diphenyldimethoxysilane, methylphenyldimethoxysilane, cyclohexylmethyldimethoxysilane, tertiary-butylethyldimethoxysilane, ethylmethyldimethoxysilane, propylmethyldimethoxysilane, cyclohexyltrimethoxysilane, diisopropyldimethoxysilane, dicyclopentyldimethoxysilane, vinyltrimethoxysilane, phenyltrimethoxysilane, allyltrimethoxysilane and the like.

Illustrative examples of the organic silicon compound represented by the above formula (VI) include tetraethoxysilane, methyltriethoxysilane, ethyltriethoxysilane, vinyltriethoxysilane, butyltriethoxysilane, pentyltriethoxysilane, isopropyltriethoxysilane, 1-propenyltriethoxysilane, isopropenyltriethoxysilane, ethynyltriethoxysilane, octyltriethoxysilane, dodecyltriethoxysilane, phenyltriethoxysilane, allyltriethoxysilane and the like.

As for the amount of the organic silicon compound represented by the above formula (V) or (VI), the molar ratio of silicon atoms to titanium atoms contained in the solid titanium catalyst component is preferably 0.1 to 500, more preferably 1 to 100. The molar ratio (V/VI) of the two different organic silicon compounds is preferably 1:5 to 1:25, more preferably 1:10 to 1:20. When the molar ratio of the organic silicon compounds (V) and (VI) is smaller than 1:5, the elution peak width measured by TREF of the obtained polypropylene resin becomes narrow, that is, the amount of a component having an elution temperature of 36 to 104° C. decreases, thereby reducing stretchability at the time of film formation, increasing a metal load and causing the breakage of a film by stretching very often.

The addition order of the above components is not particularly limited. The organic silicon compounds represented by the above formulas (V) and (VI) may be supplied at the same time or separately. They may be contacted to or mixed with the organic aluminum compound and then supplied.

Other preferred polymerization conditions are as follows. The polymerization temperature is preferably 20 to 200° C., more preferably 50 to 150° C. Hydrogen may be existent in polymerization as a molecular weight modifier. Polymerization may be slurry polymerization, solvent-free polymerization or vapor-phase polymerization and may be carried out in batch, semi-batch or continuous system. Polymerization may be carried out in two stages under different conditions. Before the polymerization of propylene, the prepolymerization of propylene or other monomer may be carried out. The above polymerization may be carried out in multiple stages.

In the present invention, the polypropylene resin composition obtained by the above method may be used alone or blended with other polypropylene resin. Polypropylene resin compositions obtained by the above method may be blended together as a matter of course.

In the present invention, a polyolefin resin composition containing a component having an elution temperature of 36 to 104° C. and a molecular weight of 100,000 to 1,000,000 measured by TREF/SEC in an amount of 4 to 20 wt % can be obtained directly from the polyolefin resin composition obtained as described above or by selecting an appropriate polyolefin resin composition obtained as described above. Alternatively, the crystalline polyolefin resin composition of the present invention having desired composition can be obtained by mixing the modifier (A1) or crystalline polyolefin resin with the above resin composition.

The crystalline polyolefin resin composition of the present invention which comprises a modifier (A1) and a modifier (A2) containing a component having an elution temperature of more than 116° C. and a molecular weight of 10,000 to 100,000 measured by TREF/SEC in an amount of 20 to 100 wt % can be obtained in the same manner as described above. Alternatively, the crystalline polyolefin resin composition of the present invention may be obtained by mixing the modifier (A1) and the modifier (A2) which contains a component having an elution temperature of more than 116° C. and a molecular weight of 10,000 to 100,000 measured by TREF/SEC in an amount of 20 to 100 wt % with the crystalline polyolefin resin.

Modifier (A2)

The above modifier (A2) is a highly crystalline polypropylene resin. The melt flow rate of the modifier (A2) is preferably 5 to 100 g/10 min, more preferably in the range of 30 to 80 g/10 min in consideration of moldability into a film. The weight average molecular weight (Mw) of the modifier (A2) is preferably in the range of 50,000 to 800,000, more preferably 100,000 to 300,000.

The molecular weight distribution (Mw/Mn) of the modifier (A2) is preferably 1.5 to 40, more preferably 2 to 10 in consideration of film forming ease and the improvement of workability caused by an increase in melt tension.

The melting point of the above modifier (A2) is preferably 150° C. or more, more preferably 155 to 170° C.

The peak top temperature of an elution curve measured by TREF of the modifier (A2) is preferably 110° C. or more, more preferably 115 to 130° C. in consideration of the rigidity and heat resistance of the formed oriented film.

The component having an elution temperature of 0° C. or less measured by TREF/SEC of the modifier (A2) is preferably contained in an amount of 5 wt % or less, more preferably 3 wt % or less in consideration of the surface properties such as anti-blocking properties, scratch resistance and slipperiness of the formed polyolefin film.

When the modifier (A2) is a propylene homopolymer or propylene-α-olefin copolymer and contains an α-olefin other than propylene in an amount of less than 1 mol %, the fraction of isotactic pentad sequence measured by $^{13}$C-NMR and indicating the crystallizability of the modifier is preferably 0.80 to 1, more preferably 0.93 to 0.99.

Alternatively, a modifier (to be referred to as "modifier (A1/A2)") may be obtained by mixing the modifier (A1) and the modifier (A2) in a ratio of 20/80 or 80/20 and mixed with the crystalline resin.

The weight ratio (A2/A1) of the effective component of the modifier (A1) to the effective component of the modifier (A2) to be mixed with the crystalline polyolefin resin is preferably in the range of 0.5 to 2, more preferably 0.8 to 1.5. Within the above range, the effect of improving stretchability at the time of film formation, that is, the expansion of the width of film processable temperature, a reduction in mechanical load, a reduction in film breakage and the improvement of thickness accuracy for stretching can be made possible.

Other Components

The polyolefin resin composition of the present invention may contain additives such as an antioxidant, chlorine trapping agent, heat stabilizer, antistatic agent, anti-fogging agent, ultraviolet light absorber, lubricant, nucleating agent, anti-blocking agent, pigment, other resin and filler as required in limits that do not prevent the effect of the present invention.

Molding of Polyolefin Resin Composition

The polyolefin resin composition of the present invention may be used in the production of all kinds of moldings and exhibits excellent extrudability and stretchability. Particularly, it shows a marked effect when it is stretched to obtain an oriented film.

The polyolefin oriented film of the present invention may be either a biaxially oriented or uniaxially oriented film. The thickness of the oriented film is preferably 3 to 150 μm in the case of a biaxially oriented film and 10 to 254 μm in the case of a uniaxially oriented film. The draw ratio is 4 to 10 times in a uniaxial direction and further 4 to 15 times in a direction perpendicular to the above uniaxial direction in the case of biaxial orientation.

One side or both sides of the polyolefin oriented film of the present invention may be surface treated by corona discharge or the like as required. Further, a layer of other resin having a lower melting point than the polyolefin resin used in the present invention may be formed on one side or both sides of the polyolefin oriented film to provide such a function as heat sealability. The method of forming the other resin layer on the polyolefin oriented film is not particularly limited but it is preferably coextrusion or lamination.

To produce the polyolefin oriented film of the present invention, known methods may be employed. For example, when an oriented film is formed by sequential biaxial orientation using a tenter, the above polypropylene resin composition is formed into a sheet or film by a T-die method or inflation method, the sheet or film is supplied to a vertical stretching machine to be stretched to 3 to 10 times in a longitudinal direction at a heating roll temperature of 120 to 170° C. and then stretched to 4 to 15 times in a transverse direction at a tenter temperature of 130 to 180° C. using a tenter. The above molding conditions are not particularly limited. However, to obtain an oriented film having excellent thickness accuracy and fusing sealability, the sheet or film is preferably stretched to 3 to 5 times in a longitudinal direction at 145 to 170° C. and to 4 to 12 times in a transverse direction at 155 to 180° C. Further, it is heat set at 80 to 180° C. while it is relaxed by 0 to 25% in a transverse direction as required. As a matter of course, it may be stretched again after this and multi-stage stretching and rolling may be combined for stretching in a longitudinal direction. An oriented film may be obtained by stretching in only a uniaxial direction.

The polyolefin resin composition of the present invention is characterized in that it has a wider range of film processable temperature than conventionally known polyolefin resins, the mechanical load at the time of stretching is small, the thickness accuracy of the formed film is high, stretchability is satisfactory and film breakage by stretching hardly occurs. Therefore, the polyolefin resin composition of the present invention is a polyolefin resin composition which allows for stable and continuous operation and is suitable for the production of an oriented film. Further, the formed oriented film has excellent heat resistance such as thermal shrinkage. These effects show that the polyolefin resin composition of the present invention is excellent as a polyolefin resin composition for an oriented film and of great industrial value.

EXAMPLES

The following examples and comparative examples are provided for the purpose of further illustrating the present invention but are in no way to be taken as limiting.

(1) TREF/SEC

The molecular weight distribution curve, the weight average molecular weight and the amount of elution measured at an elution temperature range by TREF/SEC were obtained using the multi-purpose liquid chromatograph of Uniflows Co., Ltd. in a TREF/SEC mode under the following conditions.

solvent: orthodichlorobenzene

TREF column: 4.6 mm in diameter×150 mm filler: chromosolve P flow rate: 1.0 ml/min crystallization condition: 140 to 0° C. (cooling rate: 2.0° C./hr)

temperature elevation condition: 4° C. in each step, 36 fractions in total (0, 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, 128, 132, 136, 140)

SEC column: SHODEX UT 807+806M×2

SEC constant temperature bath: 145° C.

detector: infrared detector for high-temperature liquid chromatography measurement wavelength: 3.41 μm sample concentration: 0.4 wt % amount of injection: 500 μl

In this case, a sample solution is introduced into the TREF column at 140° C. and stopped, and the temperature of the TREF column is lowered from 140° C. to 0° C. at a rate of 2° C./hour to crystallize the sample polymer on the surface of a filler. After the sample polymer is maintained at 0° C. for 30 minutes, a component dissolved at 0° C. is introduced into the SEC column at a rate of 1.0 ml/min to carry out SEC measurement. Meanwhile, the temperature of the TREF constant temperature bath is raised to the next measurement temperature (4° C.) rapidly and maintained at that temperature until the SEC measurement is over. Similarly, a component dissolved at 4° C. is introduced into the SEC column to carry out SEC measurement. The SEC measurement is carried out repeatedly until the set temperature is reached.

(2) TREF

The amount of elution at each temperature measured by TREF is obtained using the multi-purpose liquid chromatograph of Uniflows Co., Ltd. in a TREF mode under the following conditions.

solvent: orthodichlorobenzene

TREF column: 4.6 mm in diameter×150 mm filler: chromosolve P flow rate: 1.0 ml/min crystallization condition: 140 to 0° C. (cooling rate: 2.0° C./hr)

temperature elevation condition: continuous elevation of temperature, 40° C./hr (temperature range of 0 to 140° C.)

detector: infrared detector for high-temperature liquid chromatography measurement wavelength: 3.41 μm sample concentration: 0.4 wt % amount of injection: 500 μl

Like TREF/SEC, after the sample is crystallized, it is maintained at 0° C. for 30 minutes and the concentration of a component dissolved at 0° C. is detected. Thereafter, the temperature of the TREF column is elevated linearly at a predetermined rate, a solvent is caused to flow to detect the concentration of the component, and the amount of elution is obtained at each elution temperature.

(3) Melt Flow Rate (MFR)

This is measured in accordance with JIS K 7210.

(4) Molecular Weight Distribution

This is calculated from values of weight average molecular weight and number average molecular weight obtained from an elution profile which is measured using the SSC-7100 high-temperature GPC apparatus of Senshu Kagaku Co., Ltd. under the following conditions.

solvent: orthodichlorobenzene flow rate: 1.0 ml/min column temperature: 145° C.

detector: high-temperature differential refractive index detector column: SHODEX UT 807 (1), 806M (2), 802.5 (1)

sample concentration: 0.1 wt % amount of injection: 0.50 ml (5) Fraction of Isotactic Pentad Sequence

This is measured using the JNM-GSX-270 ($^{13}$C-NMR having a nuclear resonance frequency of 67.8 MHz) of JEOL Ltd. under the following conditions.

measurement mode: 1H-complete decoupling pulse width: 7.0 μsec (C45°)

pulse repetition time: 3 sec total number of times: 50,000 solvent: mixed solvent of orthodichlorobenzene/heavy benzene (90/10 vol%)

sample concentration: 120 mg/2.5 ml of solvent measurement temperature: 120° C.

In this case, the fraction of isotactic pentad sequence is obtained by measuring the cleavage peak in the methyl group region of the $^{13}$C-NMR spectrum. The assignment of the peak of the methyl group region is based on A. Zambelli et al (Macromolecules 13, 267 (1980)).

(6) DSC Measurement

The melting point is measured using the DSC6200R apparatus of Seiko Instruments Co., Ltd. under the following conditions.

temperature ascending rate: 10° C./min (temperature range of 230 to −30° C.)

temperature descending rate: 10° C./min (temperature range of −30 to 230° C.)

Example 1

(Preparation of Solid Titanium Catalyst)

A solid titanium catalyst was prepared in accordance with the method described in Example 1 of JP-A 58-83006. That is, 9.5 g (100 mmol) of anhydrous magnesium chloride, 100 ml of decane and 47 ml (300 mmol) of 2-ethylhexyl alcohol were heated at 125° C. and stirred for 2 hours, and 5.5 g (37.5 mmol) of anhydrous phthalic acid was added to this solvent and stirred and mixed at 125° C. for 1 hour to prepare a uniform solution. After the solution was cooled to room temperature, the total amount of the solution was added dropwise to 400 ml (3.6 mmol) of titanium tetrachloride maintained at −20° C. over 1 hour. Thereafter, the temperature of this mixed solution was raised to 110° C. over 2 hours and 5.4 ml (25 mmol) of diisobutyl phthalate was added when 110° C. was reached and maintained at 110° C. for 2 hours under agitation. After the end of 2 hours of a reaction, a solid portion was collected by filtration under heating and suspended in 2,000 ml of titanium tetrachloride again and a heating reaction was carried out at 110° C. for 2 hours again. After the end of the reaction, a solid portion was collected by filtration under heating again and fully washed with decane and hexane until a free titanium compound in the wash liquid was not detected. The solid titanium catalyst prepared by the above production method was kept as a heptane slurry. As for the composition of the solid titanium catalyst, it contained 2.1 wt % of titanium, 57.0 wt % of chlorine, 18.0 wt % of magnesium and 21.9 wt % of diisobutyl phthalate.

(Prepolymerization)

2,000 ml of purified n-hexane, 500 mmol of triethylaluminum, 25 mmol of cyclohexylmethyldimethoxysilane and 50 mmol in terms of titanium atoms of a solid titanium compound component which was subjected to a contact treatment were charged into a 10-liter polymerizer the inside of which was substituted with nitrogen, and propylene was introduced into the polymerizer continuously for 1 hour in an amount of 2 g based on 1 g of the solid titanium catalyst component. The temperature was maintained at 15° C. during this period. The reaction was stopped after 1 hour and the inside of the reactor was fully substituted by nitrogen. The solid portion of the obtained slurry was washed with purified n-hexane 5 times to obtain a prepolymerization catalyst (titanium-containing polypropylene). As the result of analysis, 1.7 g of propylene was polymerized based on 1 g of the solid titanium catalyst.
(Polymerization)

500 kg of propylene was charged into a 2,000-liter polymerizer the inside of which was substituted by nitrogen, 1,752 mmol of triethylaluminum, 17.5 mmol of cyclohexylmethyldimethoxysilane and 350 mmol of tetraethoxysilane as organic silicon compounds, and 10 l of hydrogen were charged into the polymerizer, and then the temperature inside the polymerizer was elevated to 65° C. 4.38 mmol in terms of titanium atoms of the prepolymerization catalyst obtained in the above prepolymerization was charged and then the inside of the polymerizer was elevated to 70° C. to carry out the copolymerization of propylene and ethylene for 2 hours. After the end of the polymerization, unreacted propylene was purged, and the obtained white granular polymer was vacuum dried at 70° C. for 1 hour. The structural characteristics of the obtained polyolefin resin a are shown in Table 1 and Table 2.
(Granulation)

0.1 part by weight of 2,6-di-t-butylhydroxytoluene as an antioxidant, 0.1 part by weight of calcium stearate as a chlorine trapping agent, 0.2 part by weight of stearyl diethanolamide as an antistatic agent and 0.1 part by weight of spherical polymethyl methacrylate particles having an average particle diameter of 1.5 $\mu$m as an anti-blocking agent were added to 100 parts by weight of the polyolefin resin a powders obtained in the above polymerization of propylene, mixed with a Henschel mixer for 5 minutes, extruded with an extrusion granulating machine having a screw diameter of 65 mm at 230° C. and granulated to obtain raw material pellets.
(Formation of Biaxially Oriented Film)

Experiments on the formation of a biaxially oriented film were conducted using the obtained raw material pellets by the following method. The raw material pellets were extruded from a T-die sheet extruder having a screw diameter of 90 mm at 280° C. to form a sheet having a thickness of 1 mm with a 30° C. cooling roll. Thereafter, this raw sheet was stretched between rolls to 5.6 times in a longitudinal direction (machine direction:MD) using a tenter system sequential biaxial stretching machine and then to 10 times in a transverse direction (TD) in the tenter at 165° C., relaxed by 4% and heat set to form a 20 $\mu$m-thick biaxially oriented polyolefin film at a rate of 50 m/min.

At the time of film formation, the preheating temperature of a roll for stretching in a longitudinal direction was changed to evaluate the range of film processable temperature (from lower limit temperature to upper limit temperature). By lowering the preheating temperature of the roll, the lower limit temperature at which 10 minutes of stable film formation was possible without causing film whitening, thickness nonuniformity and film breakage was taken as the lower limit of film processable temperature. By raising the preheating temperature of the roll, the upper limit temperature at which 10 minutes of stable film formation was possible without causing film whitening by the melting of the surface of a longitudinally stretched sheet, thickness nonuniformity and the like was taken as the upper limit of film processable temperature. The difference between the upper limit and the lower limit of film processable temperature was taken as the width of film processable temperature. The film processability (stretchability) was evaluated from mechanical loads (current value, unit ampere) applied to longitudinal-direction stretching and transverse-direction stretching at a center temperature of the temperature width. The influence of stretching nonuniformity on thickness accuracy was evaluated from the thickness pattern of a film measured with the WEB GAGE infrared thickness measuring instrument of Yokogawa Electric Corporation installed between the tenter and the winding machine based on the following criteria.

⊚: less than ±0.5 $\mu$m

○: 0.5 $\mu$m or more and less than 1.0 $\mu$m

Δ: ±1.0 $\mu$m or more and less than 1.5 $\mu$m

×: ±1.5 $\mu$m or more

Further, the number of times of film breakage by stretching in the tenter was evaluated by carrying out 5 hours of continuous operation. One side of the formed film was treated with 30 W min/m$^2$ of corona discharge by a commonly used method and wound. After the obtained oriented film was aged at 40° C. for 3 days, the thermal shrinkage (heat resistance) of the film was measured by the following method.

A tape-form sample measuring 600 mm in length and 15 mm in width was cut out from the film in longitudinal and transverse directions, marked for a length of 500 mm (50 mm from both ends) and left in a 120° C. atmosphere for 15 minutes. Then, the film sample was taken out and cooled at room temperature for 15 minutes to measure the length between marks so as to measure its thermal shrinkage from the following equation.

$$\text{thermal shrinkage } (\%) = \{(L_0 - L_S)/L_0\} \times 100$$

$L_0$: length between marks before thermal shrinkage (500 mm)

$L_S$: length between marks after thermal shrinkage (mm)

The range of film processable temperature, mechanical loads applied to longitudinal-direction stretching and transverse-direction stretching, the number of times of film breakage by stretching during 5 hours of continuous operation, thickness accuracy and thermal shrinkages in longitudinal and transverse direction of an oriented film are shown in Table 3.

Example 2

The procedure of Example 1 was repeated except that 27 mmol of cyclohexylmethyldimethoxysilane and 285 mmol of ethyltriethoxysilane were used as organic silicon compounds to homopolymerize propylene to obtain a polyolefin resin b shown in Table 1. The results are shown in Tables 1, 2 and 3.

Comparative Example 1

The procedure of Example 1 was repeated except that 164 mmol of cyclohexylmethyldimethoxysilane was used alone as an organic silicon compound to homopolymerize propylene to obtain polypropylene (polyolefin resin c) shown in Table 1. The results are shown in Tables 1, 2 and 3.

Comparative Examples 2 and 3

The procedure of Comparative Example 1 was repeated to obtain polyolefin resins d and e except that ethylene was copolymerized. The results are shown in Tables 1, 2 and 3.

Comparative Example 4

The procedure of Comparative Example 1 was repeated except that propylene was homopolymerized using t-butylethyldimethoxysilane as an organic silicone compound in the polymerization to obtain a polyolefin resin f. The results are shown in Tables 1, 2 and 3.

Example 3

The procedure of Comparative Example 1 was repeated except that copolymerization with ethylene was conducted in polymerization to obtaine a polyolefin resin g shown in table 1.

The procedure of Example 1 was repeated except that the polyolefin resin g and the polyolefin resin c obtained in Comparative Example 1 were used in amounts shown in Table 2. The results are shown in Tables 2 and 3.

Examples 4 and 5

The procedure of Example 3 was repeated except that the amounts were changed as shown in Table 2. The results are shown in Tables 2 and 3.

Example 6

The procedure of Example 1 was repeated except that the propylene-ethylene copolymer (polyolefin resin h) (Biscole 660 of Sanyo Chemical Industries, Ltd.) shown in Table 1 and the polyolefin resin d obtained in Comparative Example 2 were used in amounts shown in Table 2. The results are shown in Tables 2 and 3.

Example 7

Method of Producing Polyolefin Resin I (Preparation of Carried Metallocene Catalyst)

100 ml of a toluene solution of rac-dimethylsilylenebis-1-(2-methylbenzindenyl)zirconium dichloride (0.005 mmol/ml of toluene solution) was added to 10 g of methyl aluminoxane carried on a silica gel (MaO on $SiO_2$, manufactured by Whitco Co., Ltd., 25 wt %-Al product) and stirred at room temperature for 30 minutes. The reaction mixture was then filtered, and the obtained solid was washed with 50 ml of toluene two times and vacuum dried to obtain a metallocene catalyst carried on a silica gel. It was found that 0.045 mmol of metallocene was carried based on 1 g of the catalyst.
(Polymerization)

600 kg of propylene was injected into a polymerizer having an inner volume of 2 $m^3$ and 612 mmol of triisobutylaluminum was introduced into the polymerizer. Thereafter, the temperature inside the polymerizer was elevated to 55° C. Subsequently, ethylene gas was supplied to a vapor-phase concentration of 6.0 mol % and then 10 g of the above metallocene catalyst carried on a silica gel was charged. The temperature inside an autoclave was elevated to 60° C. to carry out polymerization for 2 hours while ethylene gas was supplied to achieve a constant ethylene vapor-phase concentration. After the end of polymerization, unreacted propylene was purged and dried at 50° C. for 1 hour to obtain 175 kg of a white granular polymer. The structural characteristics of the obtained polyolefin resin i are shown in Table 1.

The procedure of Example 1 was repeated except that the above polyolefin i and the polyolefin resin d obtained in Comparative Example 2 were used in amounts shown in Table 2. The results are shown in Tables 2 and 3.

Example 8

Method of Producing Polyolefin Resin J
(Polymerization)
(Former Stage, Polymerization of Propylene)

600 kg of propylene was injected into a polymerizer having an inner volume of 2 $m^3$ and 612 mmol of triisobutylaluminum was introduced into the polymerizer. Thereafter, the temperature inside the polymerizer was elevated to 55° C. Subsequently, 5 g of a metallocene catalyst carried on a silica gel obtained in the same manner as in [preparation of carried metallocene catalyst] of Example 7 was charged. The temperature inside an autoclave was elevated to 60° C. to carry out polymerization for 70 minutes.
(Latter Stage, Copolymerization of Propylene and Ethylene)

Ethylene gas was supplied to a vapor-phase concentration of 10.1 mol % after the former stage of polymerization. Copolymerization was carried out for 70 minutes while ethylene gas was supplied to maintain a constant vapor-phase concentration. After the end of polymerization, unreacted propylene was purged and dried at 50° C. for 1 hour to obtain 135 kg of a white granular polymer. The structural characteristics of the obtained polyolefin resin j are shown in Table 1.

The procedure of Example 1 was repeated except that the above polyolefin resin j and the polyolefin resin d obtained in Comparative Example 2 were used in amounts shown in Table 2. The results are shown in Tables 2 and 3.

Example 9

The procedure of Example 8 was repeated to obtain 175 kg of a white granular polymer except that the vapor-phase concentration of ethylene in the latter stage of polymerization in Example 8 was changed to 17.2 mol %. The structural characteristics of the obtained polyolefin resin k are shown in Table 1.

The procedure of Example 1 was repeated except that the above polyolefin resin k and the polyolefin resin d obtained in Comparative Example 2 were used in amounts shown in Table 2. The results are shown in Tables 2 and 3.

Examples 10 to 12

The procedure of Example 1 was repeated except that the commercially available propylene-butene copolymer (polyolefin resin l) shown in Table 1 and the polyolefin resin d obtained in Comparative Example 2 were used in amounts shown in Table 2. The results are shown in Tables 2 and 3.

Comparative Example 5

The procedure of Example 1 was repeated except that the polyolefin resin l used in Example 10 and the polyolefin resin c obtained in Comparative Example 1 were used in amounts shown in Table 2. The results are shown in Tables 2 and 3.

Examples 13 and 14

The procedure of Example 1 was repeated except that the polyolefin resin l used in Example 10 and the polyolefin resin c obtained in Comparative Example 1 were used in amounts shown in Table 2. The results are shown in Tables 2 and 3.

Comparative Example 6

The procedure of Example 1 was repeated except that the polyolefin resin l used in Example 10 and the polyolefin resin c obtained in Comparative Example 1 were used in amounts shown in Table 2. The results are shown in Tables 2 and 3.

Examples 15 to 17

The procedure of Example 1 was repeated except that the polyolefin resin j obtained in Example 8 and the polyolefin resin c obtained in Comparative Example 1 were used in amounts shown in Table 2. The results are shown in Tables 2 and 3.

Example 18

The procedure of Example 1 was repeated except that the polyolefin resin k obtained in Example 9 and the polyolefin resin c obtained in Comparative Example 1 were used in amounts shown in Table 2. The results are shown in Tables 2 and 3.

Examples 19 and 20

The procedure of Example 1 was repeated except that the polyolefin resin k obtained in Example 9 and the polyolefin resin f obtained in Comparative Example 4 were used in amounts shown in Table 2. The results are shown in Tables 2 and 3.

Comparative Example 7

The procedure of Example 1 was repeated except that the commercially available elastomer polyolefin resin m shown in Table 1 and the polyolefin resin f obtained in Comparative Example 4 were used in amounts shown in Table 2. The results are shown in Tables 2 and 3.

Examples 21 and 22
(Preparation of Solid Titanium Catalyst)

A solid titanium catalyst was prepared in accordance with the method described in Example 1 of JP-A 58-83006. That is, 0.95 g (10 mmol) of anhydrous magnesium chloride, 10 ml of decane and 4.7 ml (30 mmol) Of 2-ethylhexyl alcohol were heated at 125° C. and stirred for 2 hours, and 0.55 g (6.75 mmol) of anhydrous phthalic acid was added to this solvent and stirred and mixed at 125° C. for 1 hour to prepare a uniform solution. After the solution was cooled to room temperature, the total amount of the solution was added dropwise to 40 ml (0.36 mmol) of titanium tetrachloride maintained at −20° C. over 1 hour. Thereafter, the temperature of this mixed solution was raised to 110° C. over 2 hours and 0.54 ml (2.5 mmol) of diisobutyl phthalate was added when 110° C. was reached and maintained at 110° C. for 2 hours under agitation. After the end of 2 hours of a reaction, a solid portion was collected by filtration under heating and suspended in 200 ml of titanium tetrachloride again and a heating reaction was carried out at 110° C. for 2 hours again. After the end of the reaction, a solid portion was collected by filtration under heating again and fully washed with decane and hexane until a free titanium compound in the wash liquid was not detected. The solid titanium catalyst prepared by the above production method was kept as a heptane slurry. As for the composition of the solid titanium catalyst, it contained 2.1 wt % of titanium, 57.0 wt % of chlorine, 18.0 wt % of magnesium and 21.9 wt % of diisobutyl phthalate.
(Prepolymerization)

200 ml of purified n-hexane, 50 mmol of triethylaluminum, 10 mmol of dicyclopentyl dimethoxysilane and 5 mmol in terms of titanium atoms of a solid titanium compound component which was subjected to a contact treatment were charged into a 1-liter polymerizer the inside of which was substituted with nitrogen, and propylene was introduced into the polymerizer continuously for 30 minutes in an amount of 2 g based on 1 g of the solid titanium catalyst component. The temperature was maintained at 10° C. during this period. The reaction was stopped after 30 minutes and the inside of the reactor was fully substituted by nitrogen. The solid portion of the obtained slurry was washed with purified n-hexane 5 times to obtain a prepolymerization catalyst (titanium-containing polypropylene). As the result of analysis, 1.7 g of propylene was polymerized based on 1 g of the solid titanium catalyst.
(Polymerization)

100 kg of propylene was charged into a 400-liter polymerizer the inside of which was substituted by nitrogen, 75 mmol of triethylaluminum, 37.5 mmol of dicyclopentyl dimethoxysilane as an organic silicon compound and hydrogen gas were further charged into the polymerizer, and then the temperature inside the polymerizer was elevated to 65° C. 0.25 mmol in terms of titanium atoms of the prepolymerization catalyst obtained in the above prepolymerization was charged and then the temperature inside the polymerizer was elevated to 70° C. to carry out polymerization for 6 hours. After the end of the polymerization, 50 ml of methanol was added as a polymerization inhibitor to stop the reaction, 30 kg of liquid propylene was added to the polymerizer, stirred for 1 hour and left to stand to precipitate polymer particles, and a liquid propylene portion was extracted from the top portion of the polymerizer by an extraction nozzle. The polymer slurry in the polymerizer was supplied to a flash tank to separate the polymer from unreacted propylene to obtain a white granular polymer. The structural characteristics of the obtained polyolefin resin n are shown in Table 1.

The procedure of Example 1 was repeated except that the polyolefin resin l used in Example 10, the polyolefin resin n and the polyolefin resin d obtained in Comparative Example 2 were used in amounts shown in Table 2. The results are shown in Tables 2 and 3.

Example 23

The procedure of Example 1 was repeated except that the polyolefin resin k obtained in Example 9 shown in Table 1, the polyolefin resin n obtained in Example 21 and the polyolefin resin c obtained in Comparative Example 1 were used in amounts shown in Table 2. The results are shown in Tables 2 and 3.

Examples 24 to 26
(Preparation of Solid Titanium Catalyst)

A solid titanium catalyst was prepared in accordance with the method described in Example 1 of JP-A 7-292029.

That is, 10 g of diethoxy magnesium and 80 ml of toluene were charged into a 200 ml flask having a round bottom and equipped with a stirrer the inside of which was fully substituted by nitrogen gas to prepare a suspension. Thereafter, 20 ml of titanium tetrachloride was added to the suspension and heated, and 2.7 ml of di-n-butyl phthalate was added when the temperature reached 80° C. and further heated at 110° C. Thereafter, the solution was stirred for 2 hours to carry out a reaction while the temperature was maintained at 110° C. After the end of the reaction, the reaction product was washed with 100 ml of toluene heated at 90° C. two times, and 20 ml of titanium tetrachloride and 80 ml of toluene were newly added, heated at 100° C. and stirred for 2 hours to carry out a reaction. After the end of the reaction, the reaction product was washed with 100 ml of n-heptane heated at 40° C. 10 times to obtain a solid titanium catalyst. When the solid and liquid contained in the solid titanium catalyst were separated from each other to measure the titanium content of the solid, it was found to be 2.91 wt %.

Prepolymerization and polymerization were carried out in the same manner as in Example 21 to obtain a white granular polymer. The structural characteristics of the obtained polyolefin resin o are shown in Table 1.

The procedure of Example 1 was repeated except that the polyolefin resin k obtained in Example 9 shown in Table 1, the polyolefin resin o and the polyolefin resin d obtained in Comparative Example 2 were used in amounts shown in Table 2. The results are shown in Tables 2 and 3.

TABLE 1

|   | MFR g/10 min | TREF 36–104 $10^5$–$10^6$ wt % | TREF >116 $10^4$–$10^5$ wt % | TREF <0° C. wt % | TREF 40–88 $10^5$–$10^6$ wt % | TREF 44–68 $10^5$–$10^6$ wt % | melting point ° C. | stereo-regularity mmmm | comonomer (mol %) | molecular weight distribution |
|---|---|---|---|---|---|---|---|---|---|---|
| a | 3.1 | 4.3 | 2.5 | 2.7 | 4.0 | 2.8 | 159 | 0.932 | ethylene 0.5 | 7.0 |
| b | 2.1 | 4.1 | 6.3 | 3.3 | 3.7 | 2.3 | 160 | 0.937 | — | 8.5 |
| c | 2.3 | 2.3 | 7.8 | 2.0 | 1.1 | 0.9 | 161 | 0.962 | — | 6.2 |
| d | 3.0 | 3.0 | 6.2 | 2.3 | 2.4 | 1.3 | 158 | 0.960 | ethylene 0.7 | 6.5 |
| e | 1.9 | 44.1 | 0 | 5.2 | 35.2 | 23.5 | 145 | — | ethylene 5.3 | 4.3 |
| f | 3.5 | 1.8 | 11.8 | 1.2 | 0.8 | 0.1 | 162 | 0.975 | — | 6.1 |
| g | 7.5 | 55.0 | 0 | 6.1 | 39.2 | 28.8 | 137 | — | ethylene 8.1 | 4.5 |
| h | 60 | 40.3 | 0 | 4.3 | 35.1 | 24.1 | 147 | — | ethylene 5.1 | 3.1 |
| i | 8.7 | 45.2 | 0 | 0 | 12.3 | 10.2 | 125 | — | ethylene 5.1 | 2.3 |
| j | 10.1 | 65.1 | 0 | 1.3 | 64.2 | 63.7 | 110–146 | — | ethylene 7.0 | 2.2 |
| k | 13.2 | 95.7 | 0 | 0.5 | 92.2 | 0.3 | 85–146 | — | ethylene 12.3 | 2.3 |
| l | 8 | 55.3 | 0 | 9.2 | 41.1 | 28.8 | 110 | — | butene 25 | 4.6 |
| m | 8 | 4.8 | 0 | 95.2 | 0 | 0 | — | — | ethylene 18.2 | 2.0 |
| n | 40 | 1.9 | 22. | 2.1 | 1.0 | 0.1 | 161 | 0.981 | — | 6.0 |
| o | 40 | 0.8 | 39.8 | 0.5 | 0.5 | 0 | 163 | 0.993 | — | 5.8 |

TABLE 2

|  | raw material 1 (quantity) wt % | | raw material 2 (quantity) wt % | | raw material 3 (quantity) wt % | | TREF 36–104 $10^5$–$10^6$ wt % A1 | TREF >116 $10^4$–$10^5$ wt % A2 | TREF <0° C. wt % |
|---|---|---|---|---|---|---|---|---|---|
| Ex. 1 | a | 100 | — | — | — | — | 4.3 | 2.5 | 2.7 |
| Ex. 2 | b | 100 | — | — | — | — | 4.1 | 6.3 | 3.3 |
| C. Ex. 1 | c | 100 | — | — | — | — | 2.3 | 7.8 | 2.0 |
| C. Ex. 2 | d | 100 | — | — | — | — | 3.0 | 6.2 | 2.3 |
| C. Ex. 3 | e | 100 | — | — | — | — | 44.1 | 0 | 5.2 |
| C. Ex. 4 | f | 100 | — | — | — | — | 1.8 | 11.8 | 1.2 |
| Ex. 3 | c | 96 | g | 4 | — | — | 4.4 | 7.5 | 2.2 |
| Ex. 4 | c | 92 | g | 8 | — | — | 6.5 | 7.2 | 2.3 |
| Ex. 5 | c | 85 | g | 15 | — | — | 10.2 | 6.5 | 2.6 |
| Ex. 6 | d | 92 | h | 8 | — | — | 6.0 | 5.7 | 2.5 |
| Ex. 7 | d | 92 | i | 8 | — | — | 6.4 | 5.7 | 2.1 |
| Ex. 8 | d | 92 | j | 8 | — | — | 8.0 | 5.7 | 2.2 |
| Ex. 9 | d | 92 | k | 8 | — | — | 10.4 | 5.7 | 2.2 |
| Ex. 10 | d | 92 | l | 8 | — | — | 7.2 | 5.7 | 2.9 |
| Ex. 11 | d | 96 | l | 4 | — | — | 5.5 | 6.0 | 2.3 |
| Ex. 12 | d | 98 | l | 2 | — | — | 4.2 | 6.0 | 2.3 |
| C. Ex. 5 | c | 98 | l | 2 | — | — | 2.9 | 6.0 | 2.3 |
| Ex. 13 | c | 96 | l | 4 | — | — | 4.4 | 6.0 | 2.3 |
| Ex. 14 | c | 85 | l | 15 | — | — | 10.3 | 6.0 | 3.1 |
| C. Ex. 6 | c | 60 | l | 40 | — | — | 23.5 | 4.7 | 4.9 |
| Ex. 15 | c | 95 | j | 5 | — | — | 5.4 | 7.4 | 2.0 |
| Ex. 16 | c | 90 | j | 10 | — | — | 8.6 | 7.0 | 1.9 |
| Ex. 17 | c | 75 | j | 25 | — | — | 18.0 | 5.9 | 1.8 |
| Ex. 18 | c | 95 | k | 5 | — | — | 7.0 | 7.4 | 1.9 |
| Ex. 19 | f | 95 | k | 5 | — | — | 6.5 | 5.4 | 4.6 |
| Ex. 20 | f | 90 | k | 10 | — | — | 11.8 | 10.5 | 1.1 |
| C. Ex. 7 | f | 0 | m | 10 | — | — | 2.1 | 10.6 | 10.6 |
| Ex. 21 | d | 92 | l | 4 | n | 4 | 5.0 | 6.6 | 2.6 |
| Ex. 22 | d | 84 | l | 8 | n | 8 | 7.1 | 7.0 | 2.8 |
| Ex. 23 | c | 68 | k | 12 | n | 20 | 9.8 | 9.7 | 1.9 |
| Ex. 24 | d | 94 | k | 4 | o | 2 | 6.7 | 6.6 | 2.2 |
| Ex. 25 | d | 97 | k | 2 | o | 1 | 4.8 | 6.4 | 2.2 |
| Ex. 26 | d | 70 | k | 10 | o | 20 | 11.8 | 12.3 | 1.8 |

TABLE 2-continued

|  | peak top molecular weight of TREF at 0° C. (× 10⁻⁴) | TREF 40–88 10⁵—10⁶ wt % | TREF 44–68 10⁵–10⁶ wt % | A2/A1 | MFR g/10 min |
|---|---|---|---|---|---|
| Ex. 1 | 22.3 | 4.0 | 2.8 | 0.58 | 3.1 |
| Ex. 2 | 32.4 | 3.7 | 2.3 | 1.54 | 2.1 |
| C. Ex. 1 | 22.9 | 1.1 | 0.9 | 3.39 | 2.3 |
| C. Ex. 2 | 21.5 | 2.4 | 1.3 | 2.07 | 3.0 |
| C. Ex. 3 | 11.5 | 35.2 | 23.5 | 0 | 1.9 |
| C. Ex. 4 | 19.5 | 0.8 | 0.1 | 6.56 | 3.5 |
| Ex. 3 | 22.9 | 2.6 | 2.0 | 1.70 | 2.4 |
| Ex. 4 | 22.9 | 4.1 | 3.1 | 1.10 | 2.5 |
| Ex. 5 | 16.9 | 6.8 | 5.1 | 0.65 | 2.8 |
| Ex. 6 | 21.5 | 5.0 | 3.1 | 0.95 | 3.8 |
| Ex. 7 | 21.5 | 3.2 | 2.0 | 0.89 | 3.3 |
| Ex. 8 | 21.5 | 7.3 | 6.3 | 0.72 | 3.3 |
| Ex. 9 | 21.5 | 9.6 | 8.4 | 0.55 | 3.4 |
| Ex. 10 | 21.5 | 9.6 | 8.4 | 0.55 | 3.4 |
| Ex. 11 | 21.5 | 4.9 | 3.8 | 1.09 | 3.1 |
| Ex. 12 | 21.5 | 3.6 | 2.5 | 1.43 | 3.1 |
| C. Ex. 5 | 22.9 | 2.4 | 1.3 | 2.07 | 2.4 |
| Ex. 13 | 22.9 | 2.7 | 2.0 | 1.69 | 2.4 |
| Ex. 14 | 22.9 | 7.1 | 5.1 | 0.65 | 2.8 |
| C. Ex. 6 | 22.9 | 17.1 | 12.1 | 0.20 | 3.8 |
| Ex. 15 | 22.9 | 4.3 | 4 | 1.36 | 2.5 |
| Ex. 16 | 22.9 | 7.4 | 7.2 | 0.82 | 2.7 |
| Ex. 17 | 22.9 | 16.9 | 16.6 | 0.33 | 3.3 |
| Ex. 18 | 22.9 | 5.7 | 5.4 | 1.06 | 2.5 |
| Ex. 19 | 24.1 | 1.2 | 11.2 | 1.73 | 3.7 |
| Ex. 20 | 24.1 | 10.5 | 9.7 | 0.89 | 4.0 |
| C. Ex. 7 | 9.1 | 0.7 | 0.1 | 5.01 | 3.8 |
| Ex. 21 | 21.5 | 3.9 | 2.4 | 1.31 | 3.5 |
| Ex. 22 | 20.8 | 5.4 | 3.4 | 0.98 | 4.0 |
| Ex. 23 | 18.4 | 8.7 | 8.3 | 1.00 | 5.0 |
| Ex. 24 | 21.5 | 6.0 | 4.8 | 0.99 | 3.4 |
| Ex. 25 | 21.5 | 4.2 | 3.1 | 1.33 | 3.2 |
| Ex. 26 | 16.8 | 11.0 | 9.9 | 1.04 | 5.8 |

TABLE 3

|  | film processable temperature | | temperature width ° C. | mechanical load | | film breakage (number of times) | thickness accuracy | thermal shrinkage | |
|---|---|---|---|---|---|---|---|---|---|
|  | lower limit ° C. | upper limit ° C. |  | MD A | TD A |  |  | MD % | TD % |
| Ex. 1 | 146 | 157 | 11 | 4.4 | 28.0 | 0 | ○ | 3.8 | 3.7 |
| Ex. 2 | 147 | 158 | 11 | 4.2 | 28.0 | 0 | ○ | 4.0 | 3.8 |
| C. Ex. 1 | 157 | 160 | 3 | 5.3 | 31.0 | 13 | × | 2.9 | 2.1 |
| C. Ex. 2 | 154 | 158 | 4 | 5.1 | 29.5 | 8 | Δ | 3.4 | 3.2 |
| C. Ex. 3 | 129 | 145 | 16 | 3.0 | 22.0 | 0 | ○ | 8.1 | 17.6 |
| C. Ex. 4 | 158 | 160 | 2 | 5.7 | 32.5 | 17 | × | 2.0 | 1.7 |
| Ex. 3 | 147 | 159 | 12 | 4.2 | 27.5 | 0 | ○ | 3.2 | 2.5 |
| Ex. 4 | 142 | 158 | 16 | 3.6 | 24.5 | 0 | ◎ | 3.8 | 4.7 |
| Ex. 5 | 137 | 156 | 19 | 3.2 | 23.0 | 0 | ◎ | 5.6 | 6.1 |
| Ex. 6 | 144 | 157 | 14 | 4.0 | 26.0 | 0 | ◎ | 4.2 | 5.1 |
| Ex. 7 | 143 | 158 | 15 | 4.0 | 25.5 | 0 | ◎ | 4.3 | 5.1 |
| Ex. 8 | 141 | 158 | 17 | 3.6 | 23.5 | 0 | ◎ | 4.2 | 4.6 |
| Ex. 9 | 139 | 158 | 19 | 3.3 | 24.0 | 0 | ◎ | 4.8 | 5.9 |
| Ex. 10 | 141 | 157 | 16 | 3.5 | 24.5 | 0 | ◎ | 4.8 | 5.9 |
| Ex. 11 | 145 | 158 | 13 | 4.1 | 26.0 | 0 | ○ | 4.2 | 5.3 |
| Ex. 12 | 147 | 158 | 11 | 4.2 | 27.0 | 0 | ○ | 3.8 | 3.5 |
| C. Ex. 5 | 156 | 160 | 4 | 5.2 | 32.5 | 10 | × | 3.4 | 3.0 |
| Ex. 13 | 147 | 159 | 12 | 4.3 | 27.5 | 0 | ○ | 3.4 | 2.9 |
| Ex. 14 | 139 | 158 | 19 | 3.7 | 23.5 | 0 | ◎ | 4.8 | 5.7 |
| C. Ex. 6 | 133 | 157 | 24 | 3.1 | 22.5 | 0 | ◎ | 7.8 | 14.6 |
| Ex. 15 | 147 | 160 | 13 | 4.3 | 27.0 | 0 | ○ | 4.0 | 4.9 |
| Ex. 16 | 142 | 159 | 18 | 3.8 | 24.0 | 0 | ◎ | 3.9 | 4.1 |
| Ex. 17 | 141 | 157 | 26 | 3.8 | 23.5 | 0 | ○ | 4.9 | 12.4 |
| Ex. 18 | 144 | 160 | 17 | 4.0 | 26.0 | 0 | ◎ | 4.6 | 4.3 |
| Ex. 19 | 145 | 160 | 15 | 4.1 | 26.0 | 0 | ◎ | 5.8 | 6.8 |
| Ex. 20 | 137 | 158 | 21 | 3.2 | 23.0 | 0 | ◎ | 4.5 | 4.7 |
| C. Ex. 7 | 156 | 160 | 4 | 5.3 | 31.0 | 15 | × | 3.2 | 2.0 |
| Ex. 21 | 146 | 158 | 12 | 4.0 | 26.5 | 0 | ○ | 4.0 | 4.9 |
| Ex. 22 | 141 | 157 | 16 | 3.7 | 24.0 | 0 | ◎ | 4.5 | 4.1 |
| Ex. 23 | 141 | 160 | 19 | 3.7 | 24.0 | 0 | ◎ | 4.2 | 4.4 |

TABLE 3-continued

|  | film processable temperature | | temperature width ° C. | mechanical load | | film breakage (number of times) | thickness accuracy | thermal shrinkage | |
|---|---|---|---|---|---|---|---|---|---|
|  | lower limit ° C. | upper limit ° C. |  | MD A | TD A |  |  | MD % | TD % |
| Ex. 24 | 142 | 158 | 16 | 3.7 | 24.5 | 0 | ⊙ | 4.2 | 4.1 |
| Ex. 25 | 146 | 158 | 12 | 4.1 | 26.5 | 0 | ○ | 3.9 | 4.8 |
| Ex. 26 | 136 | 157 | 21 | 3.2 | 22.5 | 0 | ⊙ | 4.2 | 4.5 |

Ex.: Example
C. Ex.: Comparative Example

What is claimed is:

1. A crystalline polyolefin resin composition comprising:
   (A1) 4 to 20 wt % of a polyolefin resin component having an elution temperature of 36 to 104° C. and a molecular weight of 100,000 to 1,000,000 measured by TREF/SEC; and
   (B) 96 to 80 wt % of a crystalline polyolefin resin component different from the above component (A1), the wt % being based on the total weight of the components (A1) and (B).

2. The resin composition of claim 1 which has a melt flow rate of 0.1 to 20 g/10 min.

3. The resin composition of claim 1, wherein a polyolefin resin component having an elution temperature of 0° C. or less measured by TREF/SEC is contained in an amount of 10 wt % or less.

4. The resin composition of claim 1, wherein the component (A1) is contained in an amount of 5 to 18 wt %.

5. The resin composition of claim 1, wherein a polyolefin resin composition having an elution temperature of 0° C. or less measured by TREF/SEC shows a molecular weight of 10,000 to 400,000 at the peak top of a molecular weight distribution curve.

6. The resin composition of claim 1, wherein the crystalline polyolefin resin component as the component (B) is a propylene homopolymer or a copolymer of propylene and 10 mol % or less of an α-olefin other than propylene.

7. The resin composition of claim 1 which further comprises (A2) a polyolefin resin component having an elution temperature of more than 116° C. and a molecular weight of 10,000 to 100,000 measured by TREF/SEC in an amount of 4 to 20 wt % based on the total weight of the components (A2), (A1) and (B).

8. The resin composition of claim 7, wherein the weight ratio of the component (A2) to the component (A1) is in the range of 0.5 to 2.

9. The resin composition of claim 7, wherein the component (A2) is contained in an amount of 5 to 15 wt %.

10. An oriented film of a polyolefin resin composition, said polyolefin resin composition comprising:
    (A1) 4 to 20 wt % of a polyolefin resin component having an elution temperature of 36 to 104° C. and a molecular weight of 100,000 to 1,000,000 measured by TREF/SEC; and
    (B) 96 to 80% of a crystalline polyolefin resin component different from the above component (A1), the wt % being based on the total weight of the components (A1) and (B).

11. The oriented film of claim 10, wherein the polyolefin resin composition further comprises (A2) a polyolefin resin component having an elution temperature of more than 116° C. and a molecular weight of 10,000 to 100,000 measured by TREF/SEC in an amount of 4 to 20 wt % based on the total weight of the components (A2), (A1) and (B).

* * * * *